Figure 1:

(No Model.) 2 Sheets—Sheet 1.

H. WOODWARD.
ELECTRODE FOR SECONDARY BATTERIES.

No. 393,955. Patented Dec. 4, 1888.

Witnesses:
W. W. Mortimer
R. W. Elliott

Inventor:
by Henry Woodward,
R. S. Dyrenforth,
his Attorney.

(No Model.) 2 Sheets—Sheet 2.

H. WOODWARD.
ELECTRODE FOR SECONDARY BATTERIES.

No. 393,955. Patented Dec. 4, 1888.

Witnesses:
W. N. Mortimer
R. W. Elliott

Inventor:
Henry Woodward,
by R. S. Dyrenforth,
his Attorney.

UNITED STATES PATENT OFFICE.

HENRY WOODWARD, OF SHEPHERD'S BUSH, COUNTY OF MIDDLESEX, ENGLAND, ASSIGNOR TO THE WOODWARD ELECTRICAL COMPANY, OF DETROIT, MICHIGAN.

ELECTRODE FOR SECONDARY BATTERIES.

SPECIFICATION forming part of Letters Patent No. 393,955, dated December 4, 1888.

Application filed March 9, 1888. Serial No. 266,682. (No model.)

*To all whom it may concern:*

Be it known that I, HENRY WOODWARD, a subject of the Queen of England, residing at Shepherd's Bush, in the county of Middlesex, England, have invented certain new and useful Improvements in Electrodes for Secondary Electric Batteries; and I do hereby declare the following to be a full, clear, and exact description of the invention, such as will enable others skilled in the art to which it appertains to make and use the same.

This invention relates to electrodes for secondary electric batteries.

The object is to produce an electrode for a secondary electric battery which shall present great surface exposure, which by the peculiar structure of its surface shall present the best means for retaining active material either integral with it or upon it, placed without liability of scaling or falling off, and which shall be of the highest efficiency in use, and this in a ready, practical, and comparatively inexpensive manner.

With these objects in view the invention resides in a body for a support for an electrode for a secondary electric battery, consisting of a metallic or plastic substance having embedded in its surface readily-removable matter which, when removed, will leave the surface of the substance in a cellular condition; furthermore, in a body for a support for an electrode for a secondary electric battery, consisting of a suitable metallic or plastic substance having a readily-removable mass embedded in it on one side, the opposite side being smooth; furthermore, in a support for an electrode for a secondry electric battery having embedded in its surface soluble matter which, when removed, will leave the surface of the body cellular; furthermore, in a body suitable for an electrode for a secondary electric battery consisting of a metallic or plastic substance having an irregular cellular surface and a solid backing or interior integral therewith; furthermore, in a body for a support for an electrode in a secondary electric battery, consisting of a suitable metal—such as lead—having embedded in it broken rock-salt with part of the metal above the salt to form a backing, whereby upon cooling of the metal and upon dissolving out of the salt a cast body will be presented suitable for a support for an electrode having an irregularly-cellular or highly-porous surface presenting the utmost exposure and great retaining capabilities of any substance to it applied and a smooth surface in the nature of a backing; furthermore, in a support for an electrode for a secondary electric battery, consisting of metallic or plastic substance having a transverse cut or depression and having embedded in it at one surface readily-removable matter; furthermore, in a support for an electrode for a secondary electric battery, consisting of a cellular surface and smooth-backed parts laid together back to back; finally, in an electrode for a secondary electric battery, consisting of an irregular cellular-surfaced support, as described, with active material, as set forth.

In the accompanying drawings, forming part of this specification, I have illustrated, though of course the same may be somewhat varied without departing from the spirit of my invention, successive constructions of my support or electrode, an unlicensed employment of any of which, either alone or in conjunction with other matter, would be an infringement of my rights and those of my assignee, THE WOODWARD ELECTRICAL COMPANY.

Figure 2:
Figure 3:
Figure 4:
Figure 5:
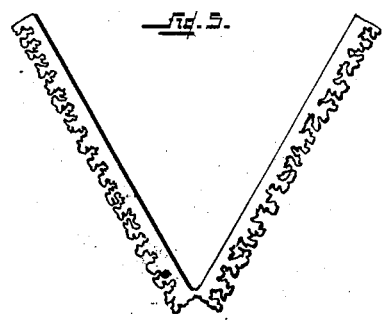
Figure 6:
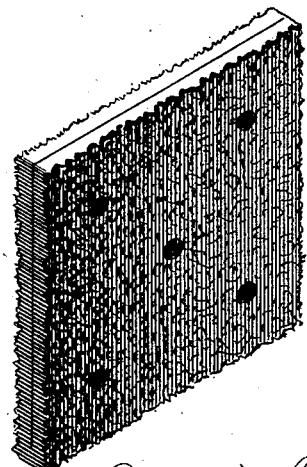

In the drawings, Figure 1 is a longitudinal sectional view showing the metallic or plastic substance in the mold. Fig. 2 is a longitudinal sectional view of the metallic or plastic substance upon its layer of penetrable substance in the mold, and showing the mold with a central transverse ridge. Fig. 3 is a longitudinal sectional view of a portion of the metallic or plastic substance out of the mold, showing the penetrable matter—such as rock-salt in crystals—adhering to its under surface. Fig. 4 is a longitudinal sectional view of the metallic or plastic substance after removal of the penetrable matter—such as rock-salt—removed by solution, showing the one surface of the substance roughened, cellular, or highly porous, and the other comparatively smooth, and showing also a transverse cut or line of demarkation or division. Fig. 5 is a view of the metallic or plastic substance out of the mold with the embedding matter removed, and showing the bending to bring the backs together, made possible by the transverse depression. Fig. 6 is a perspective view of a support or electrode consisting of two parts with outer surfaces cellular and inner surfaces solid, laid together and fastened.

As an illustration of one means of carrying the invention into effect, a suitable mold is partly filled with a quantity of any suitable substance into which molten metal or plastic material will penetrate, and which can afterward be readily removed. It is preferred to employ a soluble substance, and of soluble substances the preference is given to broken rock-salt. The rock-salt is filled into the mold to any depth sufficient to leave a suitable thickness for a solid plate above. Upon the crystals of rock-salt molten metal—such as lead—is poured, preferably, from a perforated ladle, delivering the metal into the mold in small streams. The molten metal then enters the interstices between the pieces or crystals of salt, and besides overflowing the salt and running against the sides of the mold forms a continuous sheet above. After cooling, the metallic substance is taken from the mold and the salt is dissolved out, whereupon the substance will be presented with one surface in a rough, cellular, or highly-porous condition, and with the other comparatively smooth, presenting, where the mold is of the shape here chosen to illustrate the invention, a solid metallic plate protruding from one side of which is the cellular mass referred to; and it will be seen that, owing to the varied forms of the pieces or crystals of rock-salt, or of the different directions of the interstices of the matter into which the molten metal or other metallic body has penetrated, the cells formed by the penetrated matter will form a net-work of cavities particularly adapted firmly to retain any plastic mass applied to the body or inserted into the cells. It will be obvious, however, that the resulting support or electrode may be round with a rough surface and central solid body, or of any other desired form, according to the shape of the mold and the disposition of the penetrable matter.

The roughened and cellular surface may itself present an electrode, or will form an admirable support for an active material—such as lead oxide—which, when applied in a plastic condition by smearing on and pressure, will be caused to take the form of the various cells, and the outer surface also presenting retaining-points, it will there be firmly held when the whole is in use as an electrode, thus obviating the great objection of the scaling off or falling of the active material from its support, which is the common fault of electrodes as now made for use in secondary batteries. By the peculiar formation of the roughened surface, also, the utmost surface exposure is presented.

After the support has been molded it is preferable to bend or break it in two, with the solid portion within and the rough protion without, and the two parts are then fastened together, as by punching holes through them at one or more points and supplying them with leaden rivets, the whole then presenting a suitable support or electrode.

As required, these supports are provided with active material, as by smearing such upon them in a plastic state and pressing it into the cells, and a proper electrode is then produced by forming in the usual manner; or, if the cellular substance be of proper nature for the purpose, it may be formed direct.

The method of producing the support herein described is not now claimed, the same forming the subject-matter of an application for patent filed of even date herewith, Serial No. 266,681.

Having thus fully described my invention, what I claim as new, and desire to secure by Letters Patent, is—

1. A body for a support for an electrode for a secondary electric battery, consisting of a suitable metallic or plastic substance having a readily-removable mass embedded in on one side, the opposite side being smooth, substantially as set forth.

2. A body suitable for an electrode for a secondary electric battery, consisting of a metallic or plastic mass having an irregular cellular surface and a solid backing or interior integral therewith, substantially as described.

3. A body for a support for an electrode in a secondary electric battery, consisting of a suitable metal—such as lead—having embedded in it broken rock-salt with part of the metal above the salt to form a backing, whereby, upon cooling of the metal and upon dissolving of the salt, a cast-body will be presented suitable for a support for an electrode having an irregularly-cellular or highly-porous surface, presenting the utmost exposure and great retaining capabilities of any substance to it applied, and a smooth surface in the nature of a backing, substantially as set forth.

4. A support for an electrode for a secondary electric battery, consisting of metallic or plastic substance having a transverse cut or depression and having embedded in it at one surface readily-removable matter, substantially as described.

5. A support for an electrode for a secondary electric battery, consisting of a cellular surface and smooth backed parts laid together back to back, substantially as described.

6. An electrode for a secondary battery, consisting of a support having an irregular cellular surface and solid interior, the cellular surface holding active material, substantially as described.

In testimony whereof I affix my signature in presence of two witnesses.

HENRY WOODWARD.

Witnesses:
WM. FITZSIMONS,
J. B. EMMONS,
*Both of U. S. Consulate, Liverpool.*